No. 661,192. Patented Nov. 6, 1900.
W. OSTENDORFF.
WATER COOLING APPARATUS.
(Application filed Aug. 10, 1900.)

(No Model.)

Witnesses
Edward C. Rowland.
Kathleen Snell.

Inventor
William Ostendorff.
By his Attorney
Andrew Wilson.

THE NORRIS PETERS CO., PHOTO-LITHO., WASHINGTON, D. C.

UNITED STATES PATENT OFFICE.

WILLIAM OSTENDORFF, OF UNION HILL, NEW JERSEY.

WATER-COOLING APPARATUS.

SPECIFICATION forming part of Letters Patent No. 661,192, dated November 6, 1900.

Application filed August 10, 1900. Serial No. 26,466. (No model.)

*To all whom it may concern:*

Be it known that I, WILLIAM OSTENDORFF, a citizen of the United States, and a resident of Union Hill, county of Hudson, and State of New Jersey, have invented certain new and useful Improvements in Water-Cooling Apparatus, of which the following is a specification.

My invention is directed particularly to improvements in means for cooling water by natural aeration and evaporation, caused by allowing the water to fall in fine drops or streams through the air; and my improvements consist particularly in the apparatus which I employ for causing the water to fall in the desired manner.

Figure 1:
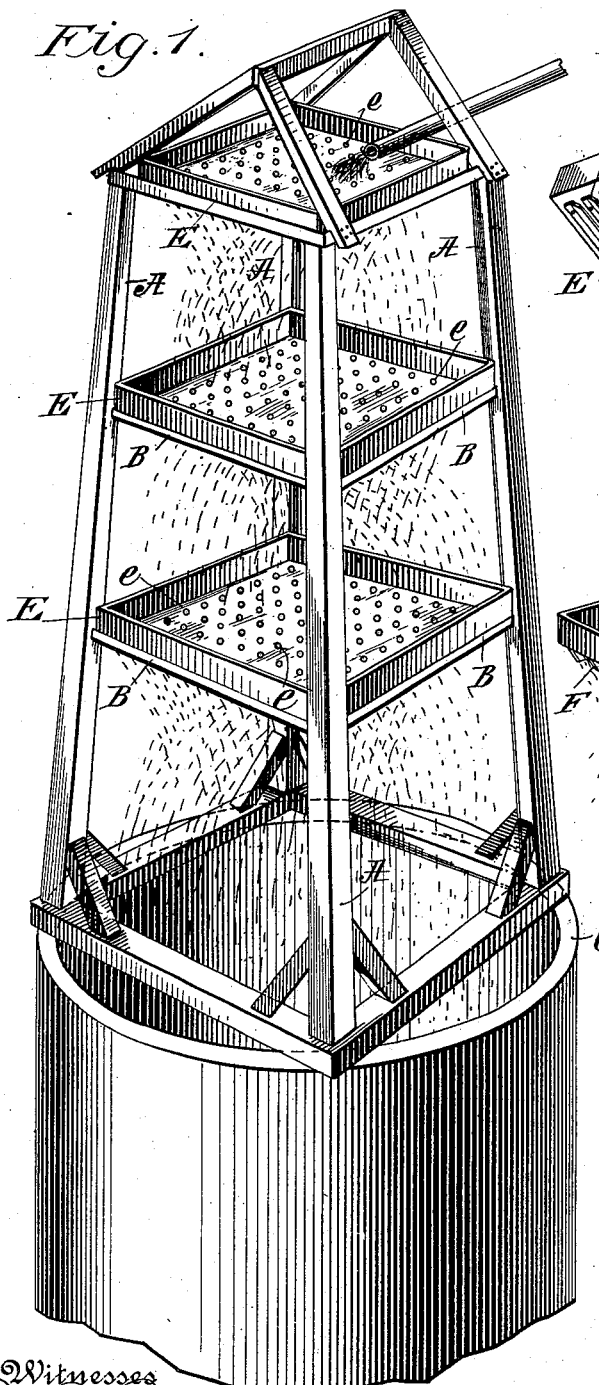
Figure 2:
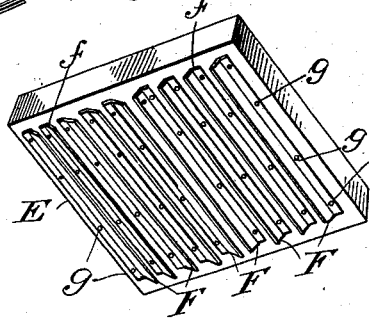
Figure 3:
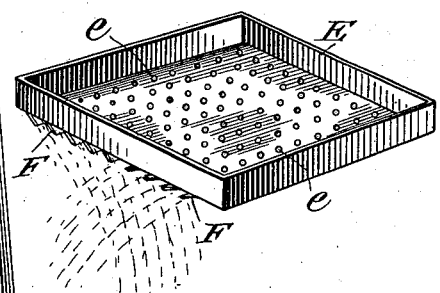
Figure 4:
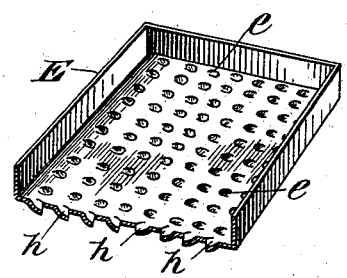

In the drawings, Figure 1 is a perspective view of my improved water-cooling apparatus. Fig. 2 is a perspective view showing the bottom of one of the water-pans. Fig. 3 is a perspective view showing the inside of one of the water-pans; and Fig. 4 shows a modification of the same, one side of the pan being broken away to show the interior more clearly.

Similar letters of reference designate similar parts in all the figures.

The framework of my apparatus consists, essentially, of four uprights A A A A, with cross-beams B B B to support the water-pans E E E, the tower being suitably braced at the top and foot. The pan-supporting beams are rabbeted on their inner sides, so that the water-pans may sit partly within the beams and be firmly held in place.

The water-pans are made, preferably, of sheet metal and are provided with perforations through their bottoms to allow the water to trickle through. The perforations are placed in lines across the pans, and to the bottom of each pan is secured a series of inclined flanges F F, which are fastened to the bottom of the pan by rivets $g\ g$, passing through the members $f f$ of the flanges F F. The water falling into the topmost pan will run through the holes $e\ e\ e$ with more or less force, depending on the volume of the water and the pressure with which it is delivered from the pipe. The drops or streams of water falling through the holes $e\ e\ e$ will strike upon the inclined upper surfaces of the flanges F F and running down the inclined surfaces will fall from the edges in curved lines toward the opposite side of and into the pan next below. As shown in the drawings, the flanges F F are inclined from either side of the pan toward its center, so that the streams of water falling from opposite sides of the pan will cross and intersect, thus breaking up the streams into spray, giving a longer course to the water in its fall and affording greater opportunity for aeration and evaporation and increasing the cooling of the liquid. The rows of perforations and flanges of the second pan are at right angles to those of the first, so that the water falling from the second pan is sprayed to left or right of its previous course, thus still more effectually exposing it to the action of the air in its descent. This method of arrangement is preferably continued with the succeeding pans, of which any desired number may be used.

In Fig. 4 I have shown a modification of the pans wherein the holes through the bottom are punched at an angle, leaving an inclined lip or spout $h\ h$, which gives to the escaping water an inclined curved course as it falls. In this form I am enabled to dispense with the use of flanges and to produce the water-deflectors from the material of the pan itself. The angle of these holes may be considerably varied, so that the streams from the different apertures cross and intersect each other, breaking up the water into drops and facilitating its cooling, as already mentioned.

In the drawings I have shown the openings as being inclined toward the center from either side; but I desire it to be understood that the angle and arrangement of the deflecting-holes may be considerably varied without departing from the spirit of my invention.

Having thus described my invention, what I claim, and desire to secure by Letters Patent of the United States, is—

1. In a water-cooling apparatus, the combination, with a pan-sustaining framework, of a series of water-pans, each provided with a multiplicity of small apertures in its bottom, and with a series of inclined deflectors formed of metallic strips secured by one edge to its under side, to cause the water to fall from opposite sides of the pan, in intersecting curves, substantially as and for the purposes set forth.

2. In a water-cooling apparatus, the combination, with a pan-sustaining framework, of a series of water-pans, each provided with a multiplicity of small apertures in its bottom, arranged in a series of rows across the pan, and provided beneath each of said series of holes with a continuous metallic strip attached to the bottom of the pan through an integral flange and having a free depending edge inclined toward the center of the pan, whereby the water is caused to fall from opposite sides of the pan in intersecting curves, substantially as and for the purposes set forth.

3. In a water-cooling apparatus, the combination, with a pan-sustaining framework of a series of water-pans, each provided with a multiplicity of small apertures in its bottom arranged in a series of rows across the pan and provided beneath each of said series of holes, with a continuous metallic strip attached to the bottom of the pan through an integral flange, and having a free depending edge inclined toward the center of the pan, whereby the water is caused to fall from opposite sides of the pan in intersecting curves, the deflectors of each succeeding pan being set at an angle to those on the pan next above, substantially as and for the purposes set forth.

WILLIAM OSTENDORFF.

Witnesses:
WM. D. NEILLEY,
KATHLEEN SNELL.